United States Patent
Ito

(10) Patent No.: US 10,295,892 B2
(45) Date of Patent: May 21, 2019

(54) LIGHT SOURCE DEVICE AND PROJECTOR

(71) Applicant: SEIKO EPSON CORPORATION, Tokyo (JP)

(72) Inventor: Yuta Ito, Azumino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 15/876,650

(22) Filed: Jan. 22, 2018

(65) Prior Publication Data
US 2018/0217480 A1    Aug. 2, 2018

(30) Foreign Application Priority Data

Feb. 1, 2017    (JP) ................. 2017-016874

(51) Int. Cl.
| | |
|---|---|
| *F21V 7/04* | (2006.01) |
| *G03B 21/20* | (2006.01) |
| *G03B 33/12* | (2006.01) |
| *H04N 9/31* | (2006.01) |
| *G03B 21/28* | (2006.01) |

(52) U.S. Cl.
CPC ......... *G03B 21/204* (2013.01); *G03B 21/208* (2013.01); *G03B 21/2053* (2013.01); *G03B 33/12* (2013.01); *G03B 21/206* (2013.01); *G03B 21/2073* (2013.01); *G03B 21/28* (2013.01); *H04N 9/3102* (2013.01)

(58) Field of Classification Search
CPC ........ F21V 29/83; F21V 13/02; F21V 7/0033; F21V 7/043; G02F 1/133604; G02B 13/22; G02B 2027/0112; G02B 27/0172; G02B 27/0933; G02B 27/0944; G02B 27/0961; G02B 27/425; G02B 5/02; G02B 5/0294
See application file for complete search history.

(56) References Cited

U.S. PATENT DOCUMENTS

| | | | |
|---|---|---|---|
| 8,733,940 B2 | 5/2014 | Tanaka et al. | |
| 2003/0039036 A1* | 2/2003 | Kruschwitz | ........ G02B 27/0927 359/707 |
| 2009/0086473 A1* | 4/2009 | Tan | ..................... G02F 1/13318 345/102 |

(Continued)

FOREIGN PATENT DOCUMENTS

JP    2012-137744 A    7/2012

*Primary Examiner* — Thien M Le
(74) *Attorney, Agent, or Firm* — Oliff PLC

(57) ABSTRACT

A light source device includes: a light source section; a diffusing device on which a portion of light emitted from the light source section is incident, the diffusing device diffusely emitting the portion of the light; a wavelength conversion device on which another portion of the light emitted from the light source section is incident, the wavelength conversion device diffusely emitting converted light at a wavelength different from that of the another portion of the light; a light combining device combining the portion of the light diffused by the diffusing device with the converted light emitted from the wavelength conversion device; and an auxiliary diffusing element located between the light source section and the diffusing device on an optical path of the portion of the light, the auxiliary diffusing element diffusing the portion of the light and causing the portion of the light to be incident on the diffusing device.

12 Claims, 6 Drawing Sheets

(56) References Cited

U.S. PATENT DOCUMENTS

| | | | |
|---|---|---|---|
| 2009/0185141 A1* | 7/2009 | Chen | G02B 27/48 |
| | | | 353/38 |
| 2011/0216269 A1* | 9/2011 | Kobayashi | G02F 1/1335 |
| | | | 349/62 |
| 2012/0140183 A1 | 6/2012 | Tanaka et al. | |
| 2012/0206912 A1* | 8/2012 | Marquardt | F21S 8/06 |
| | | | 362/235 |
| 2013/0083554 A1* | 4/2013 | Jaster | F21S 19/005 |
| | | | 362/555 |
| 2016/0195718 A1* | 7/2016 | Evans | G02B 5/0294 |
| | | | 345/8 |
| 2017/0167697 A1* | 6/2017 | Stevenson | F21K 9/64 |

* cited by examiner

LIGHT SOURCE DEVICE AND PROJECTOR

BACKGROUND

1. Technical Field

The present invention relates to a light source device and a projector.

2. Related Art

In the related art, a light source device that emits white light including blue light and fluorescence (yellow light) has been known as a light source device employed in a projector (e.g., see JP-A-2012-137744).

In the light source device disclosed in JP-A-2012-137744, the blue light emitted from a solid-state light source unit is reduced in diameter by two lenses, and diffused by a diffuser so that the illuminance in a plane is homogenized. Then, the blue light is incident on a half-wave plate. The optical axis of the half-wave plate is adjusted such that 90 to 70% of the incident blue light is an s-polarization component and 10 to 30% of the incident blue light is a p-polarization component. The blue light passing through the half-wave plate is incident on a dichroic mirror.

The dichroic mirror has the characteristics of reflecting the s-polarization component of the blue light, transmitting the p-polarization component thereof, and also transmitting green light and red light. That is, the dichroic mirror disclosed in JP-A-2012-137744 has wavelength-selective polarization separation characteristics. The s-polarization component of the blue light incident on the dichroic mirror from the half-wave plate is reflected to a fluorescence emitting plate side, and the p-polarization component of the blue light is transmitted to a polarization-direction converting section side.

The s-polarization component reflected to the fluorescence emitting plate side is incident on the fluorescence emitting plate through a condenser lens serving as a condensing element that condenses the s-polarization component (excitation light) onto the fluorescence emitting plate, and the fluorescence is emitted from the fluorescence emitting plate. The fluorescence is condensed and collimated by the condenser lens, and passes through the dichroic mirror.

On the other hand, the p-polarization component transmitted to the polarization-direction converting section side is converted to the s-polarization component by a quarter-wave plate and a reflector, and is reflected by the dichroic mirror in the same direction as the passing direction of the fluorescence.

With this configuration, illumination light (white light) including the fluorescence and the blue light is emitted from the light source device.

As a layout of optical components that constitute a light source device, various layouts have been proposed. As one example of the layout, a layout is conceivable, in which excitation light incident on a wavelength conversion device (e.g., the fluorescence emitting plate) and blue light incident on a diffusing device are separated from blue light emitted from a light source section based on the polarization state or the like, and illumination light obtained by combining the fluorescence diffusely emitted from the wavelength conversion device with the blue light diffusely emitted from the diffusing device is emitted.

Here, in a light source device in which the optical path of excitation light (hereinafter referred to as "excitation optical path") from the light source section to the wavelength conversion device is different from the optical path of blue light (hereinafter referred to as "blue optical path") from the light source section to the diffusing device, a difference is likely to occur between the luminous flux diameter (image size) of the excitation light on the wavelength conversion device and the luminous flux diameter (image size) of the blue light on the diffusing device. When the light source device is employed in a projector, the following problem occurs.

The projector includes an optical component that is in conjugate relationship with the diffusing device and the wavelength conversion device. Images on the diffusing device and the wavelength conversion device are formed again on the optical component. When there is a difference between the image sizes on the diffusing device and the wavelength conversion device, regions that are lost due to stopping down by the optical component are different. Therefore, when a formed image is projected onto a screen, color unevenness occurs because of the generation of regions where the illuminances of the respective lights (blue light and fluorescence) are different.

For this reason, it is necessary to match the image size on the wavelength conversion device to the image size on the diffusing device.

In contrast, when the excitation optical path is relatively long, a plurality of lenses that adjust the image size on the wavelength conversion device are easily disposed, and thus the image size of the excitation light can be adjusted by the plurality of lenses. However, when the image size of the excitation light is matched to the image size of the blue light on the diffusing device, the image size of the excitation light is likely to deviate from an optimum image size, which affects the brightness of the fluorescence emitted from the light source device.

On the other hand, it is conceivable to adjust the image size of the blue light by disposing one lens on the blue optical path without lengthening the blue optical path. However, it is difficult to control the image size on the diffusing device using one lens. In contrast, it is conceivable to match the image size of the blue light to the image size of the excitation light by disposing a pair of multi-lenses, called a homogenizer optical device, between the light source section and the diffusing device to constitute an indirect illumination system. In this case, however, problems occur in that the optical path of the blue light is lengthened and thus that the light source device is increased in size.

Because of the problems, it is desired to configure a light source device so as to be capable of suppressing the occurrence of color unevenness in an image projected by a projector, while realizing the miniaturization of the light source device.

SUMMARY

An advantage of some aspects of the invention is to provide a light source device and a projector both of which can suppress the occurrence of color unevenness.

A light source device according to a first aspect of the invention includes: a light source section; a diffusing device on which a portion of light emitted from the light source section is incident, the diffusing device diffusely emitting the portion of the light; a wavelength conversion device on which another portion of the light emitted from the light source section is incident, the wavelength conversion device diffusely emitting converted light at a wavelength different from that of the another portion of the light; a light combining device combining the portion of the light diffused by the diffusing device with the converted light emitted from the wavelength conversion device; and an auxiliary diffusing element located between the light source section and the diffusing device on an optical path of the portion of the light, the auxiliary diffusing element diffusing the portion of the light and causing the portion of the light to be incident on the diffusing device, wherein an optical path of the another portion of the light from the light source section to the wavelength conversion device is longer than the optical path of the portion of the light from the light source section to the diffusing device.

Examples of the light emitted from the light source section include blue light. Examples of the converted light emitted from the wavelength conversion device include yellow light including green light and red light.

Examples of the wavelength conversion device can include a configuration including a phosphor that is excited by incident light and converts the wavelength of the light.

According to the first aspect, the optical path of the another portion of the light from the light source section to the wavelength conversion device is longer than the optical path of the portion of the light from the light source section to the diffusing device. Therefore, the image size of the another portion of the light on the wavelength conversion device can be easily adjusted.

Moreover, the portion of the light can be diffusely incident on the diffusing device by the auxiliary diffusing element on the optical path of the portion of the light, which is shorter than the optical path of the another portion of the light. That is, the image size of the portion of the light incident on the diffusing device can be adjusted by the auxiliary diffusing element, and thus the image size on the wavelength conversion device and the image size on the diffusing device can be easily matched to each other. Hence, when the light source device is employed in a projector, the generation of regions that are different in illuminance ratio due to the difference between the image sizes can be suppressed, and the occurrence of color unevenness can be suppressed in a displayed image.

Further, the occurrence of the color unevenness can be suppressed by the auxiliary diffusing element, and thus the optical path of the portion of the light can be set shorter than the optical path of the another portion of the light. Therefore, the light source device can be miniaturized.

In the first aspect, it is preferable that the diffusing device diffuses the portion of the light incident thereon while transmitting the portion of the light.

According to this configuration, compared to the case where the diffusing device diffuses the portion of the light while reflecting the portion of the light, the lengthening of the optical path of the portion of the light can be suppressed. Hence, the light source device can be miniaturized.

In the first aspect, it is preferable that the light source section includes a plurality of solid-state light sources each emitting light, that the light source device includes a superimposing element located between the light source section and the auxiliary diffusing element on the optical path of the portion of the light and superimposing the portion of the light emitted from the plurality of solid-state light sources onto the diffusing device, and that the superimposing element is formed of one lens.

Here, lights emitted from the solid-state light sources are superimposed by the superimposing element onto the diffusing device. Therefore, the occurrence of luminance unevenness can be suppressed in the diffused light emitted from the diffusing device.

Moreover, the superimposing element is formed of one lens. Therefore, the lengthening of the optical path of the portion of the light from the light source section to the diffusing device can be suppressed, and the light source device can be easily miniaturized.

Further, the image size on the diffusing device can be adjusted by the auxiliary diffusing element as described above. Therefore, the image size on the diffusing device and the image size on the wavelength conversion device can be easily matched to each other. Hence, the occurrence of the illuminance unevenness can be favorably suppressed.

In the first aspect, it is preferable that the light source section includes a first light source section emitting blue light as the portion of the light along a first illumination optical axis, and a second light source section disposed side by side with the first light source section and emitting excitation light as the another portion of the light along a second illumination optical axis substantially parallel to the first illumination optical axis, that the light source device includes a reflective member reflecting the excitation light emitted from the second light source section, along a third illumination optical axis intersecting the first illumination optical axis and the second illumination optical axis, that the wavelength conversion device is disposed on the third illumination optical axis and emits the converted light in a direction opposite to an incident direction of the excitation light, and that the light combining device is located at an intersection of the first illumination optical axis and the third illumination optical axis.

According to this configuration, the optical path of the excitation light traveling along the second illumination optical axis and the third illumination optical axis can be reliably made longer than the optical path of the blue light traveling along the first illumination optical axis. Moreover, compared to the configuration in which the second light source section is disposed at a position where the second light source section emits the excitation light along the third illumination optical axis, the light source device can be miniaturized.

In the first aspect, it is preferable that the light source device further includes: a first lens disposed between the second light source section and the reflective member on the second illumination optical axis, the first lens condensing the excitation light emitted from the second light source section; a second lens disposed between the reflective member and the light combining device on the third illumination optical axis, the second lens collimating the excitation light reflected by the reflective member; and an excitation light condensing element disposed between the light combining device and the wavelength conversion device on the third illumination optical axis, the excitation light condensing element condensing the excitation light onto the wavelength conversion device, collimating the converted light incident from the wavelength conversion device, and causing the converted light to be incident on the light combining device.

According to this configuration, compared to the case where the first lens is absent, the use efficiency of the light emitted from the second light source section can be increased. Moreover, the excitation light collimated by the second lens is condensed by the excitation light condensing element and incident on the wavelength conversion device, and therefore, the excitation light can be efficiently incident on the wavelength conversion device. Further, the excitation light condensing element collimates the converted light emitted from the wavelength conversion device and causes the converted light to be incident on the light combining device. Therefore, the diffuse emission of the converted light can be suppressed.

In addition, the image size of the excitation light on the wavelength conversion device can be adjusted by adjusting the condensing magnification of the excitation light through the first lens, the second lens, and the excitation light condensing element. Hence, the respective image sizes on the wavelength conversion device and the diffusing device can be easily matched to each other, and the occurrence of the color unevenness can be favorably suppressed.

In the first aspect, it is preferable that the light source device further includes a diffusing element disposed between the second lens and the light combining device and diffusing the excitation light incident on the diffusing element.

Here, if illuminance unevenness occurs in an illumination region illuminated by the excitation light on the wavelength conversion device, and when the excitation light having a locally high illuminance is incident on the illumination region, thermal saturation is likely to occur. Thus, wavelength conversion efficiency for the converted light is reduced, and also, the life span of the wavelength conversion device may be shortened.

In contrast, the excitation light diffused by the diffusing element is condensed by the excitation light condensing element and incident on the wavelength conversion device, and therefore, the occurrence of illuminance unevenness can be suppressed in the illumination region illuminated by the excitation light. Hence, the occurrence of the thermal saturation can be suppressed, and the reduction in wavelength conversion efficiency for the converted light and the shortening of the life span of the wavelength conversion device can be suppressed.

A projector according to a second aspect of the invention includes: the light source device described above; a light modulating device modulating light emitted from the light source device; and a projection optical device projecting the light modulated by the light modulating device.

According to the second aspect, advantageous effects similar to those of the light source device according to the first aspect can be provided, and in addition, the occurrence of color unevenness can be suppressed in a formed and projected image because the projector includes the light source device.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

Figure 1:
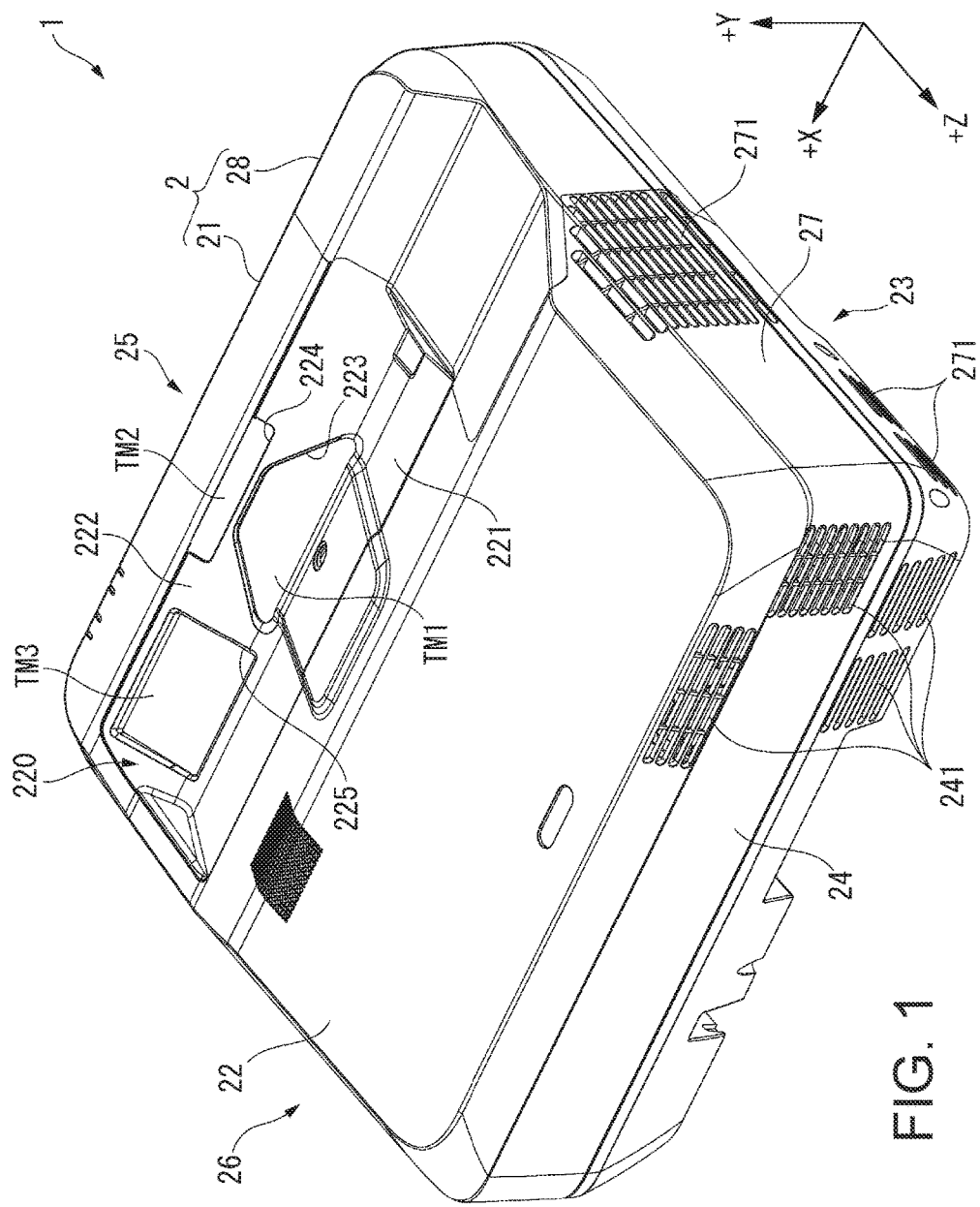
FIG. 1 is a perspective view showing an external appearance of a projector according to a first embodiment of the invention.

Hereinafter, a first embodiment of the invention will be described based on the drawings.
Schematic Configuration of Projector FIG. 1 is a perspective view showing an external appearance of a projector 1 according to the embodiment. Specifically, FIG. 1 is a front top perspective view of the projector 1.

The projector 1 according to the embodiment modulates light emitted from a light source device 4 (see FIG. 2) provided inside the projector, to form an image in response to image information, and enlarges and projects the image onto a projection surface such as a screen. The projector 1 includes an external housing 2 accommodating a device main body (not shown in FIG. 1).

Although described in detail later, the projector 1 includes the light source device 4 whose one of features lies in a layout of optical components.

Hereinafter, each configuration of the projector 1 will be described.
Configuration of External Housing The external housing 2 includes a housing main body 21 and a cover member 28 attached to the housing main body 21 and constituting the exterior of the projector 1 together with the housing main body 21. The external housing 2 is formed in a substantially rectangular parallelepiped shape as a whole.

The housing main body 21 includes a top face section 22, a bottom face section 23, a front face section 24, a rear face section 25, a left face section 26, and a right face section 27. The housing main body 21 has a substantially rectangular parallelepiped shape in which a portion of the rear face section 25 on the right face section 27 side (in other words, a portion of the right face section 27 on the rear face section 25 side) is cut away.

The top face section 22 includes, in a position on the rear face section 25 side, a recess 220 formed by a first inclined section 221 and a second inclined section 222. In the first inclined section 221 and the second inclined section 222, the first inclined section 221 located on the front face section 24 side is inclined in a direction close to the bottom face section 23 toward the rear face section 25 side, while the second inclined section 222 located on the rear face section 25 side is inclined in a direction close to the bottom face section 23 toward the front face section 24 side. Three openings 223 to 225 are formed in the second inclined section 222.

The opening 223 is formed in a trapezoidal shape substantially in the center of the second inclined section 222. The opening 223 is an opening through which image light emitted to the front face section 24 side and the top face section 22 side by a projection optical device 35, to be described later, passes. The opening 223 is closed by a light transmissive member TM1 that transmits visible light.

The opening 224 is located on the rear face section 25 side with respect to the opening 223. Although not shown, a light receiving section that receives an infrared signal from a remote controller is disposed in the opening 224. The opening 224 is closed by a light transmissive member TM2 that transmits infrared light.

The opening 225 is located on the left face section 26 side with respect to the opening 223. Although not shown, an image capturing device that captures an image of a projected region of the image light and detects the position of a pointer in the projected region is disposed in the opening 225. The opening 225 is closed by a light transmissive member TM3.

The front face section 24 includes a plurality of inlet ports 241 for introducing a gas outside the external housing 2 as a cooling gas. The right face section 27 includes a plurality of discharge ports 271 for discharging the cooling gas after the cooling gas cools cooling objects in the external housing 2.

In the housing main body 21, the intersecting portion of the rear face section 25 and the right face section 27 is cut away at a substantially right angle as described above. A terminal section (not shown) to which various cables can be connected is provided on a face of the intersecting portion that is parallel to the rear face section 25. The intersecting portion is covered by the cover member 28, so that the terminal section is not exposed and the external appearance of the projector 1 becomes favorable. The cover member 28 is removably attached to the intersecting portion, and therefore, the cables can be connected to the terminal section by removing the cover member 28.

In the following description and drawings, the traveling direction of image light projected through the opening 223, as viewed in a direction facing the top face section 22, is defined as the +Z-direction. In the +X-direction and the +Y-direction, which are orthogonal to the +Z-direction and orthogonal to each other, the +Y-direction is defined as a direction from the bottom face section 23 toward the top face section 22, and the +X-direction is defined as a direction from the right face section 27 toward the left face section 26. Although not shown, a direction opposite to the +Z-direction is defined as the −Z-direction.

Configuration of Device Main Body

Figure 2:
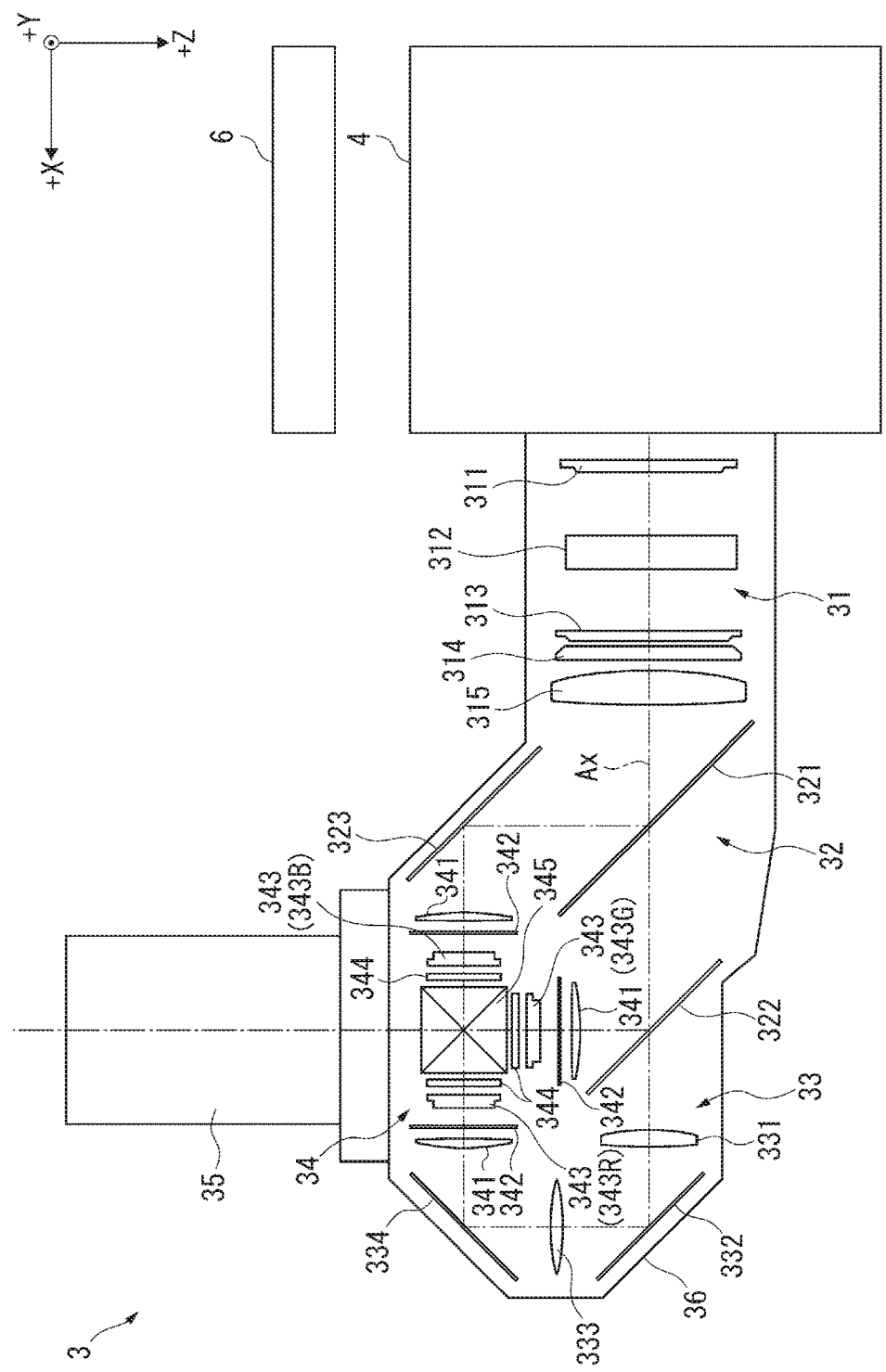
FIG. 2 is a schematic view showing the configuration of a device main body in the embodiment.

FIG. 2 is a schematic view showing the configuration of the device main body.

As shown in FIG. 2, the device main body includes an image projecting device 3 and a control device 6. Although not shown, the device main body further includes a power source device that supplies power to electronic components constituting the projector 1, and a cooling device that cools cooling objects constituting the projector 1.

The control device 6 is configured to include a control circuit, and controls the operation of the projector 1. For example, the control device 6 outputs image information (image signal) to light modulating devices 343 to be described later, and causes the light modulating devices 343 to form image light in response to the image information. In addition, the control device 6 controls the turn-on of the light source device 4 and the amount of light emission thereof.

Configuration of Image Projecting Device

Under the control of the control device 6, the image projecting device 3 forms and projects an image in response to the image information. The image projecting device 3 is configured as an optical unit having a substantially L-shape along the +X-direction and the −Z-direction. The image projecting device 3 includes the light source device 4, a homogenizing device 31, a color separating device 32, a relay device 33, an image forming device 34, the projection optical device 35, and an optical component housing 36.

The light source device 4 emits a white luminous flux (illumination light) along the +X-direction. The configuration of the light source device 4 will be described in detail later.

The homogenizing device 31 homogenizes the illuminance in a plane orthogonal to the central axis of the illumination light incident from the light source device 4. The homogenizing device 31 includes, in order of incidence of the illumination light, a first lens array 311, a dimming device 312, a second lens array 313, a polarization conversion element 314, and a superimposing lens 315. The dimming device 312 may be omitted.

The first lens array 311 includes a plurality of first lenses (not shown) that divide incident illumination light into a plurality of partial luminous fluxes. The second lens array 313 includes a plurality of second lenses (not shown) that superimpose, in cooperation with the superimposing lens 315, the plurality of partial luminous fluxes incident from the first lens array 311 onto the light modulating devices 343 to be described later. The first lenses correspond one-to-one with the second lenses. The partial luminous flux emitted from a certain first lens is incident on the corresponding second lens. The second lens array 313 is in conjugate relationship with a diffusing device 45 and a wavelength conversion device 51 both to be described later. Images formed on the diffusing device 45 and the wavelength conversion device 51 are formed again on each of the second lenses of the second lens array 313. The optical path length between the second lens array 313 and the diffusing device 45 coincides with the optical path length between the second lens array 313 and the wavelength conversion device 51.

Although not shown in detail, the polarization conversion element 314 includes a plurality of polarization separation layers, a plurality of reflective layers, and a plurality of retardation layers.

The plurality of polarization separation layers and the plurality of reflective layers are formed to be long in a first direction, and are alternately arranged in a second direction. The first direction and the second direction are orthogonal to the central axis of light incident from the second lens array 313, and are orthogonal to each other. The polarization separation layers are disposed in positions on which the partial luminous fluxes emitted from the second lens array 313 are incident. The reflective layers are disposed in positions on which the partial luminous fluxes are not directly incident.

The polarization separation layer transmits p-polarized light and reflects s-polarized light. The reflective layer provided according to the polarization separation layer reflects, along the passing direction of the p-polarized light, the s-polarized light reflected by the polarization separation layer. Each of the plurality of retardation layers is provided on the optical path of the p-polarized light passing through the polarization separation layer, and converts the incident p-polarized light to the s-polarized light. With this configuration, the polarization direction of light emitted from the polarization conversion element 314 is aligned with the s-polarized light, and the s-polarized light is emitted from the substantially entire light exiting surface of the polarization conversion element 314. The polarization conversion element 314 may be configured to emit p-polarized light.

The color separating device 32 separates the luminous flux incident from the homogenizing device 31 into three color lights of red (R), green (G), and blue (B). The color separating device 32 includes dichroic mirrors 321 and 322 and a reflecting mirror 323.

The relay device 33 is provided on the optical path of the red light having a longer optical path than the other color lights among the three separated color lights. The relay device 33 includes an incident-side lens 331, a relay lens 333, and reflecting mirrors 332 and 334.

The image forming device 34 modulates the separated color lights in response to the image information, and then combines the color lights to form image light. The image forming device 34 includes field lenses 341, incident-side polarizers 342, the light modulating devices 343, and exiting-side polarizers 344, all of which are provided for the respective color lights, and includes one color combining device 345 that combines the modulated color lights to form image light.

The light modulating devices (light modulating devices for red, green, and blue are respectively denoted by 343R, 343G, and 343B) each employ the configuration of including a liquid crystal panel in the embodiment.

The color combining device 345 is formed of a cross dichroic prism in the embodiment, but may be formed of a plurality of dichroic mirrors joined together.

Figure 3:
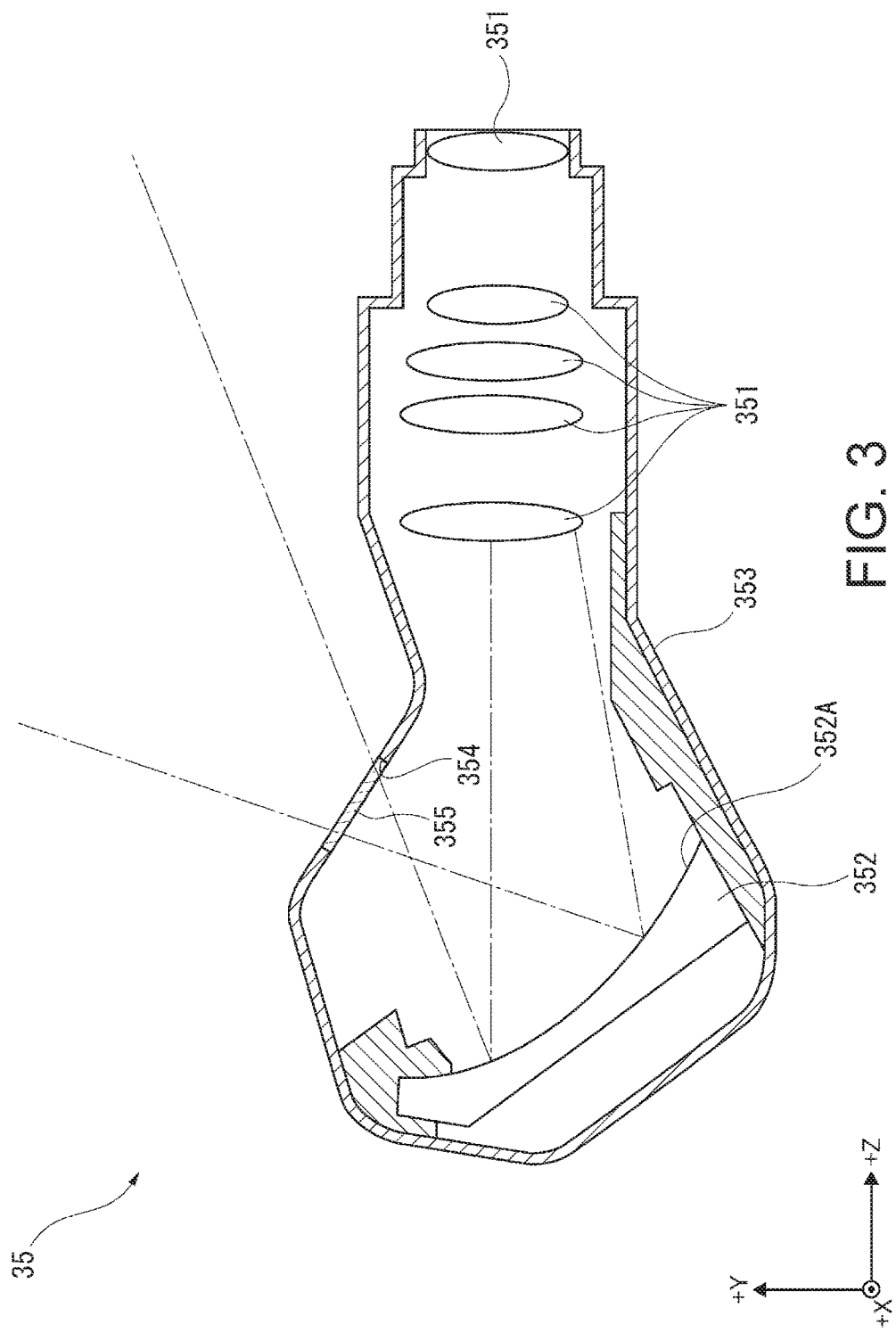
FIG. 3 is a cross-sectional view schematically showing the internal configuration of a projection optical device in the embodiment.

FIG. 3 is a cross-sectional view schematically showing the internal configuration of the projection optical device 35.

The projection optical device 35 enlarges and projects the image light incident from the image forming device 34 onto the projection surface. As shown in FIG. 3, the projection optical device 35 includes a plurality of lenses 351, an aspheric mirror 352, and a hollow holder 353 that accommodates the lenses 351 and the aspheric mirror 352.

The plurality of lenses 351 include, for example, a zoom lens and a focus lens. Although five lenses 351 are shown in FIG. 3, the number of lenses 351 that constitute the projection optical device 35 can be appropriately changed.

The aspheric mirror 352 is disposed on the most downstream side of the optical path in the projection optical device 35 such that a reflective surface 352A having a rotationally asymmetric free-form surface shape faces the +Z-direction side and the +Y-direction side. The aspheric mirror 352 reflects, with the plurality of lenses 351, the image light directed to the −Z-direction side toward the +Z-direction side and the +Y-direction side, and widens the angle of the image light.

The holder 353 includes, in a portion on the top face section 22 side in the external housing 2 (see FIG. 1) accommodating the holder 353, an opening 354 through which the image light reflected by the aspheric mirror 352 passes. A substrate 355 such as visible-light-transmitting glass fits in the opening 354. The image light passing through the opening 354 and the substrate 355 is emitted to the outside of the external housing 2 through the opening 223 (see FIG. 1).

As shown in FIG. 2, the optical component housing 36 accommodates optical components that constitute the devices 31 to 34. An illumination optical axis Ax that is a design optical axis is set in the optical component housing 36. The light source device 4 and the devices 31 to 35 are disposed at predetermined positions on the illumination optical axis Ax. For this reason, the central axis of light emitted from the light source device 4, that is, a first illumination optical axis Ax1 (see FIG. 4), to be described later, coincides with the illumination optical axis Ax.

Configuration of Light Source Device

Figure 4:
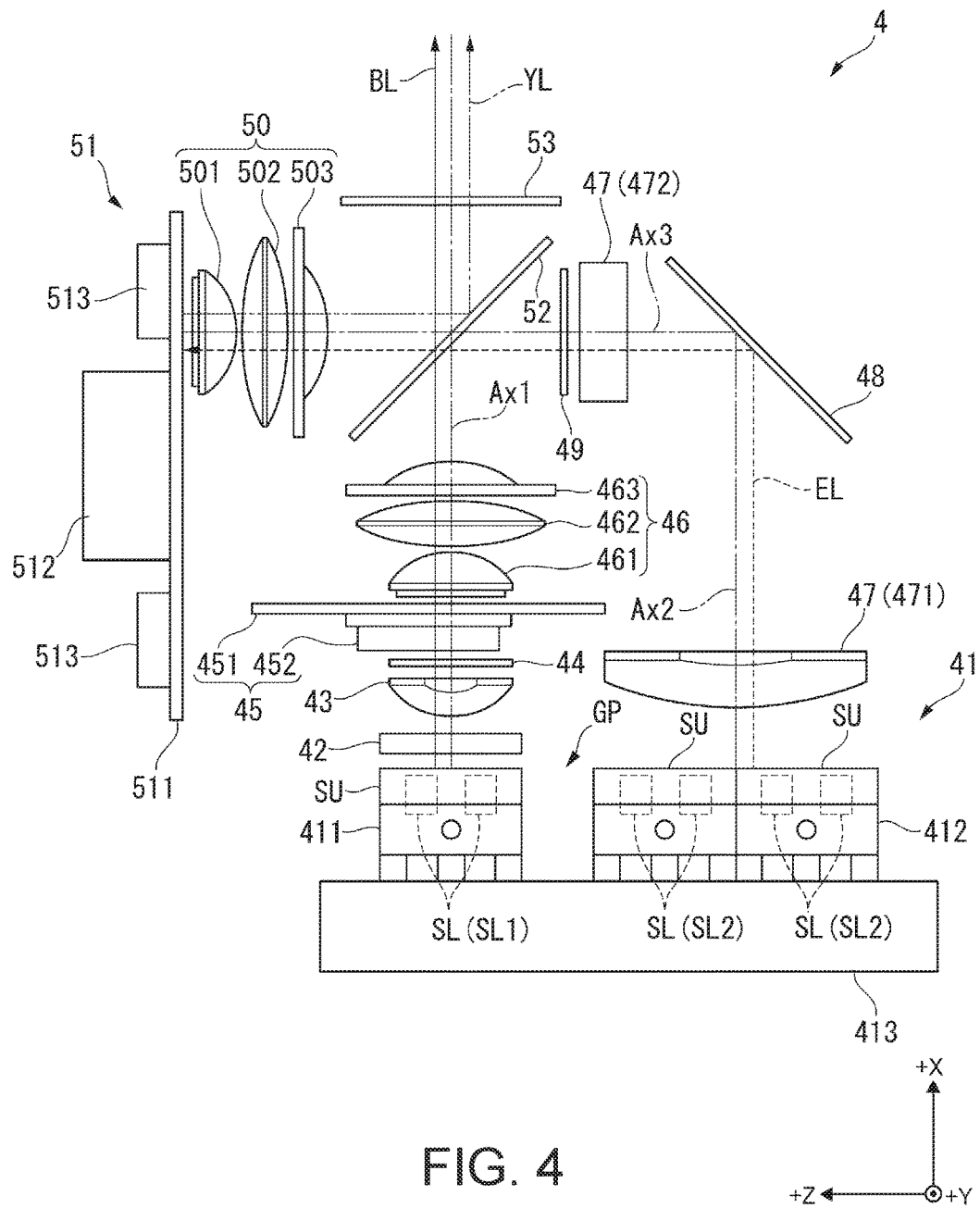
FIG. 4 is a schematic view showing the configuration of a light source device in the embodiment.

FIG. 4 is a schematic view showing the configuration of the light source device 4.

As described above, the light source device 4 emits the illumination light to the homogenizing device 31. As shown in FIG. 4, the light source device 4 includes a light source section 41, a prism mirror 42, a condensing lens 43, an auxiliary diffusing element 44, the diffusing device 45, a first condensing element 46, an afocal optical device 47, a reflective member 48, a diffusing element 49, a second condensing element 50, the wavelength conversion device 51, a light combining device 52, and a retardation film 53.

A first light source section 411 constituting the light source section 41, the prism mirror 42, the condensing lens 43, the auxiliary diffusing element 44, the diffusing device 45, the first condensing element 46, and the retardation film 53 are disposed on the first illumination optical axis Ax1 along the +X-direction. A second light source section 412 constituting the light source section 41, and a first lens 471 constituting the afocal optical device 47 are disposed on a second illumination optical axis Ax2 parallel to the first illumination optical axis Ax1. A second lens 472 constituting the afocal optical device 47, the diffusing element 49, the second condensing element 50, and the wavelength conversion device 51 are disposed on a third illumination optical axis Ax3 intersecting the first illumination optical axis Ax1 and the second illumination optical axis Ax2 along the +Z-direction. Further, the light combining device 52 is disposed at the intersection of the first illumination optical axis Ax1 and the third illumination optical axis Ax3. The reflective member 48 is disposed at the intersection of the second illumination optical axis Ax2 and the third illumination optical axis Ax3. The first illumination optical axis Ax1 and the second illumination optical axis Ax2 may not be perfectly parallel to each other. Moreover, the third illumination optical axis Ax3 may not be orthogonal to the first illumination optical axis Ax1 and the second illumination optical axis Ax2, and it is sufficient that the third illumination optical axis Ax3 intersects the illumination optical axes Ax1 and Ax2.

Configuration of Light Source Section

The light source section 41 includes the first light source section 411, the second light source section 412, and a heat dissipating member 413.

The first light source section 411 and the second light source section 412 are disposed side by side along the +Z-direction, and each emit blue light in the +X-direction. That is, the second light source section 412 is disposed on the +Z-direction side with respect to the first light source section 411.

The first light source section 411 and the second light source section 412 include solid-state light source units SU in each of which a plurality of solid-state light sources SL are disposed in the vertical and horizontal directions. Specifically, the first light source section 411 includes one solid-state light source unit SU, and the second light source section 412 includes two solid-state light source units SU. That is, the number of solid-state light sources SL2 (excitation solid-state light sources) included in the second light source section 412 is larger than the number of solid-state light sources SL1 (blue solid-state light sources) included in the first light source section 411. The amount of blue light (excitation light EL) emitted by the second light source section 412 is greater than the amount of blue light (blue light BL) emitted by the first light source section 411. This is due to the following reasons.

The blue light emitted from the first light source section 411 passes through the prism mirror 42, the condensing lens 43, the auxiliary diffusing element 44, the diffusing device 45, the first condensing element 46, the light combining device 52, and the retardation film 53 along the first illumination optical axis Ax1 without a great loss in the amount of light, and is emitted to the outside of the light source device 4.

In contrast, the blue light (excitation light EL) emitted from the second light source section 412 is used for producing fluorescence YL (light including green light and red light) in the wavelength conversion device 51, and therefore, a relatively great amount of light is required. Moreover, the produced amount (emitted amount) of the fluorescence YL depends on wavelength conversion efficiency in the wavelength conversion device 51, and is smaller than the amount of light incident on the wavelength conversion device 51.

Because of these facts, the emitted amount of the blue light from the second light source section 412 needs to be greater than the emitted amount of the blue light from the first light source section 411. For this reason, the number of solid-state light sources SL2 included in the second light source section 412 is made larger than the number of solid-state light sources SL1 included in the first light source section 411.

The two solid-state light source units SU included in the second light source section 412 are disposed in parallel along the +Z-direction (i.e., a direction between the first light source section 411 and the second light source section 412). For this reason, in the +Z-direction, the luminous flux width of the blue light from the second light source section 412 is likely to be larger than the luminous flux width of the blue light from the first light source section 411. The first lens 471 of the afocal optical device 47 is used for efficiently condensing the blue light from the second light source section 412.

Although not shown, the number of solid-state light sources SL that are arranged in the vertical direction in the solid-state light source unit SU is different from that of solid-state light sources SL that are arranged in the horizontal direction in the solid-state light source unit SU. In the embodiment, each of the solid-state light source units SU is disposed such that a column in which the number of solid-state light sources SL is small is along the +Z-direction and that a row in which the number of solid-state light sources is large is along the +Y-direction orthogonal to the first illumination optical axis Ax1 or the second illumination optical axis Ax2 and the +Z-direction. With this configuration, an increase in the size of the light source device 4 is suppressed in the +Z-direction, which is the arrangement direction of the solid-state light source units SU in the second light source section 412.

As the solid-state light source SL arranged in the solid-state light source unit SU, a laser diode (LD) that emits blue light of s-polarization having a peak wavelength of 440 nm is employed in the embodiment. However, an LD that emits blue light having a peak wavelength of 446 nm or 460 nm may be employed as the solid-state light source SL. Moreover, solid-state light sources that emit blue lights having different peak wavelengths may be mixed together in each of the light source sections 411 and 412, or a solid-state light source that emits blue light of p-polarization may be employed.

The blue light emitted from the second light source section 412 is used as excitation light to excite a phosphor included in the wavelength conversion device 51 as described above. For this reason, in the following description, the blue light emitted from the second light source section 412 may be referred to as the "excitation light EL" to distinguish it from the blue light BL emitted from the first light source section 411.

The turn-on of the first light source section 411 and the second light source section 412 is controlled by the control device 6 as described above. For this reason, it is possible by the control device 6 to adjust the emitted amount of the blue light BL by the first light source section 411 and the emitted amount of the excitation light EL by the second light source section 412. With this configuration, the control device 6 adjusts the emitted amounts of the blue light BL and the excitation light EL, so that the amount or white balance (color balance) of the illumination light emitted from the light source device 4 can be adjusted.

The heat dissipating member 413 is connected with the first light source section 411 and the second light source section 412, dissipates heat conducted from the light source sections 411 and 412, and thus cools the light source sections 411 and 412. The heat dissipating member 413 also functions as a support member that supports the first light source section 411 and the second light source section 412 and integrates them into the light source device 4. Although not shown, the heat dissipating member 413 includes heat receiving sections that support the light source sections 411 and 412, and a heat sink including a plurality of fins.

The first light source section 411 and the second light source section 412 are disposed spaced apart from each other in the +Z-direction on the heat dissipating member 413. That is, a gap GP is formed between the first light source section 411 and the second light source section 412. This is to suppress the influence of heat of one of the first light source section 411 and the second light source section 412 on the other.

Configurations of Prism Mirror and Condensing Lens

The prism mirror 42 condenses and emits the blue lights BL emitted from the solid-state light sources SL1 of the first light source section 411. Specifically, the prism mirror 42 changes the optical paths of the blue lights BL emitted from the solid-state light sources SL1 to reduce the diameter of the luminous flux of the blue light BL emitted from the first light source section 411.

The condensing lens 43 is located between the first light source section 411 and the diffusing device 45 (more specifically, between the prism mirror 42 and the auxiliary diffusing element 44) on the first illumination optical axis Ax1. The condensing lens 43 condenses the blue lights BL incident from the solid-state light sources SL1 through the prism mirror 42 onto a diffusion layer of the diffusing device 45. More specifically, the condensing lens 43 superimposes the blue lights BL emitted from the solid-state light sources SL1 onto the diffusion layer. That is, the condensing lens 43 is a superimposing element.

Configuration of Auxiliary Diffusing Element

The auxiliary diffusing element 44 is located between the condensing lens 43 and the diffusing device 45 on the first illumination optical axis Ax1. The auxiliary diffusing element 44 assists the diffusing device 45 in diffusing the blue light BL, and adjusts the luminous flux diameter (the size of a light source image) of blue light incident on the diffusing device 45 by diffusing the blue light BL incident from the condensing lens 43. The diffusivity of light through the auxiliary diffusing element 44 is smaller than the diffusivity of light through the diffusing device 45. The auxiliary diffusing element 44 can be formed of, for example, frosted glass. The function of the auxiliary diffusing element 44 will be described in detail later.

Configuration of Diffusing Device

The diffusing device 45 is disposed between the first light source section 411 and the light combining device 52 on the first illumination optical axis Ax1. Specifically, the diffusing device 45 is disposed between the auxiliary diffusing element 44 and the first condensing element 46. The diffusing device 45 diffusely transmits the blue light BL incident from the condensing lens 43 through the auxiliary diffusing element 44 at a predetermined diffusivity. That is, the diffusing device 45 is a transmissive diffusing device.

The diffusing device 45 includes a substrate 451 including a diffusion layer that diffusely transmits the incident blue light BL, and a rotating device 452 that rotates the substrate 451 about the axis of rotation substantially parallel to the first illumination optical axis Ax1. The diffusing device 45 diffusely transmits the blue light BL diffused by the auxiliary diffusing element 44 and then incident on the diffusing device 45, at a diffusion angle similar to that of the fluorescence YL emitted from the wavelength conversion device 51. The diffusion layer may be located on a surface of the substrate 451 on the incident side of the blue light BL, or may be located on a surface of the substrate 451 on the exiting side.

Although the rotating device 452 may be omitted, speckles are effectively reduced by rotating the substrate 451 with the rotating device 452.

Configuration of First Condensing Element

The first condensing element 46 is disposed between the diffusing device 45 and the light combining device 52 on the first illumination optical axis Ax1. The first condensing element 46 is a collimating element that collimates the blue light BL emitted from the diffusing device 45 and causes the blue light BL to be incident on the light combining device 52. Although the first condensing element 46 is configured to include three lenses 461 to 463 in the embodiment, the number of lenses that constitute the first condensing element 46 can be appropriately changed.

Configurations of Afocal Optical Device and Reflecting Member

The afocal optical device 47 condenses the excitation light EL emitted from the second light source section 412 to reduce the luminous flux diameter of the excitation light EL, and collimates and emits the excitation light EL reduced in diameter. The afocal optical device 47 includes the first lens 471 and the second lens 472.

The first lens 471 is disposed between the second light source section 412 and the reflective member 48 on the second illumination optical axis Ax2. The first lens 471 condenses the excitation lights EL incident from the solid-state light sources SL2 of the second light source section 412 onto the second lens 472.

The second lens 472 is disposed between the reflective member 48 and the light combining device 52 (specifically, between the reflective member 48 and the diffusing element 49) on the third illumination optical axis Ax3. The second lens 472 collimates the excitation light EL incident from the first lens 471 through the reflective member 48.

The reflective member 48 is located at the intersection of the second illumination optical axis Ax2 and the third illumination optical axis Ax3. The reflective member 48 reflect, along the third illumination optical axis Ax3, the excitation light EL incident from the first lens 471, and causes the excitation light EL to be incident on the second lens 472.

Configuration of Diffusing Element

The diffusing element 49 is disposed between the second lens 472 and the light combining device 52 on the third illumination optical axis Ax3. The diffusing element 49 is a diffuser that diffuses the excitation light EL incident from the second lens 472. The excitation light EL passes through the diffusing element 49, so that variations in illuminance in a plane orthogonal to the central axis of the excitation light EL can be suppressed.

Here, it is conceivable to employ a homogenizer optical device including a pair of multi-lenses, instead of the diffusing element 49. The homogenizer optical device has the function of homogenizing the illuminance of the excitation light EL in the plane such that the multi-lens on the incident side divides the incident excitation light EL into a plurality of partial luminous fluxes, and that the multi-lens on the exiting side superimposes the plurality of partial luminous fluxes onto a predetermined position (e.g., a wavelength conversion element 511). However, such a homogenizer optical device is expensive, and also lengthens the optical path length of the excitation light EL because a predetermined distance is needed between the pair of multi-lenses. Therefore, the homogenizer optical device is unsuitable for miniaturization of the light source device 4.

In contrast, employing the diffusing element 49 allows the light source device 4 to be configured inexpensively and enables to suppress the lengthening of the optical path length of the excitation light EL, compared to employing the homogenizer optical device. Therefore, the light source device 4 can be miniaturized.

Configuration of Second Condensing Element

The second condensing element 50 is disposed between the light combining device 52 and the wavelength conversion device 51 on the third illumination optical axis Ax3. The second condensing element 50 condenses the excitation light EL incident from the diffusing element 49 through the light combining device 52 onto the wavelength conversion device 51 (the wavelength conversion element 511), and also collimates and emits the fluorescence YL incident from the wavelength conversion device 51. That is, the second condensing element 50 corresponds to an excitation light condensing element.

Although the second condensing element 50 is configured to include three lenses 501 to 503, the number of lenses that constitute the second condensing element 50 can be appropriately changed.

Configuration of Wavelength Conversion Device

The wavelength conversion device 51 is a reflective wavelength conversion device that emits the fluorescence YL (specifically, the fluorescence YL including green light and red light, i.e., converted light by the wavelength conversion device 51) excited by the incident excitation light EL and at a wavelength different from that of the excitation light EL, in a direction opposite to the incident direction of the excitation light EL. The wavelength conversion device 51 includes the wavelength conversion element 511, a rotating device 512 that rotates the wavelength conversion element 511, and a heat dissipating member 513 that dissipates heat conducted from the wavelength conversion element 511.

The rotating device 512 rotates the wavelength conversion element 511 about the axis of rotation substantially parallel to the third illumination optical axis Ax3, to move the incident position of the excitation light EL on the wavelength conversion element 511. With this configuration, the occurrence of thermal saturation is suppressed in the wavelength conversion element 511.

The heat dissipating member 513 is located on a surface of the wavelength conversion element 511 on the side opposite to the incident side of the excitation light EL. The heat dissipating member 513 dissipates the heat generated in the wavelength conversion element 511, and cools the wavelength conversion element 511.

Although not shown in detail, the wavelength conversion element 511 includes a disc-shaped support body, a reflective layer located on the incident surface of the support body, and a wavelength conversion layer located on the reflective layer.

The wavelength conversion layer is a phosphor layer including a phosphor that is excited by the excitation light EL and thus diffusely emits the fluorescence YL (e.g., the fluorescence YL having a peak wavelength in the wavelength range from 500 to 700 nm), which is unpolarized light. A portion of the fluorescence YL generated in the wavelength conversion layer is emitted to the second condensing element 50 side, and another portion is emitted to the reflective layer side.

The reflective layer reflects the fluorescence YL incident from the wavelength conversion layer to the second condensing element 50 side.

The fluorescence YL generated in the wavelength conversion element 511 is incident on the light combining device 52 through the second condensing element 50.

Configuration of Light Combining Device

As described above, the light combining device 52 is located at the intersection of the first illumination optical axis Ax1 and the third illumination optical axis Ax3. In the embodiment, the light combining device 52 is formed of a dichroic mirror that transmits blue light and reflects green light and red light, and is disposed inclined to the illumination optical axes Ax1 and Ax3.

For this reason, the blue light BL emitted from the first light source section 411 and traveling along the first illumination optical axis Ax1 passes through the light combining device 52 along the first illumination optical axis Ax1.

The excitation light EL emitted from the second light source section 412 and reflected by the reflective member 48 passes through the light combining device 52 along the third illumination optical axis Ax3.

On the other hand, the fluorescence YL generated in the wavelength conversion device 51 is reflected by the light combining device 52 along the first illumination optical axis Ax1.

Due to the light combining device 52, the blue light BL incident from the first condensing element 46 and the fluorescence YL incident from the second condensing element 50 are emitted to the retardation film 53 side along the first illumination optical axis Ax1, and thus white illumination light including the blue light BL and the fluorescence YL combined together is incident on the retardation film 53.

Configuration of Retardation Film

The retardation film 53 rotates the polarization direction of the illumination light incident from the light combining device 52. Specifically, the retardation film 53 converts the blue light BL and the fluorescence YL that are included in the incident white light to circularly polarized light including s-polarized light and p-polarized light mixed together. The retardation film 53 is provided for the following reasons.

The fluorescence YL emitted from the light combining device 52 is unpolarized light. In a p-polarization component and an s-polarization component that form the fluorescence YL, the s-polarization component is reflected by the polarization separation layer and then reflected by the reflective layer when incident on the polarization conversion element 314, and is emitted from the polarization conversion element 314. On the other hand, the p-polarization component passes through the polarization separation layer, is converted to the s-polarization component by the retardation layer, and is then emitted from the polarization conversion element 314. As described above, the fluorescence YL is emitted from the substantially entire light exiting surface of the polarization conversion element 314 irrespective of the presence or absence of the retardation film 53.

On the other hand, the blue light BL emitted from the light combining device 52 is s-polarized light. For this reason, when the blue light BL is incident on the polarization conversion element 314 in the absence of the retardation film 53, substantially all of the blue light BL is reflected by each of the polarization separation layer and the reflective layer. Therefore, the blue light BL is emitted only from a position according to the reflective layer, on the light exiting surface of the polarization conversion element 314. That is, the blue light BL is emitted in a stripe shape from the light exiting surface of the polarization conversion element 314. In this case, the passing region of the fluorescence YL of the illumination light emitted from the polarization conversion element 314 is different from the passing region of the blue light BL of the illumination light. Therefore, illuminance unevenness occurs in the image forming region of the light modulating device 343 that is an illumination region, and thus, color unevenness occurs in an image that is formed by the light modulating device 343 and then projected.

In contrast, each of the fluorescence YL and the blue light BL is converted by the retardation film 53 to light including s-polarized light and p-polarized light mixed together, and thus the fluorescence YL and the blue light BL are emitted from the substantially entire light exiting surface of the polarization conversion element 314. Hence, the occurrence of the illuminance unevenness and thus the occurrence of the color unevenness can be suppressed.

Function of Auxiliary Diffusing Element

As described above, the auxiliary diffusing element 44 diffusely transmits the blue light BL incident from the condensing lens 43, and adjusts the luminous flux diameter (image size) of the blue light BL incident on the diffusing device 45. The diffusivity of the blue light BL through the auxiliary diffusing element 44 is lower than the diffusivity of the blue light BL through the diffusing device 45.

The auxiliary diffusing element 44 is provided for the following reasons.

Figure 5:
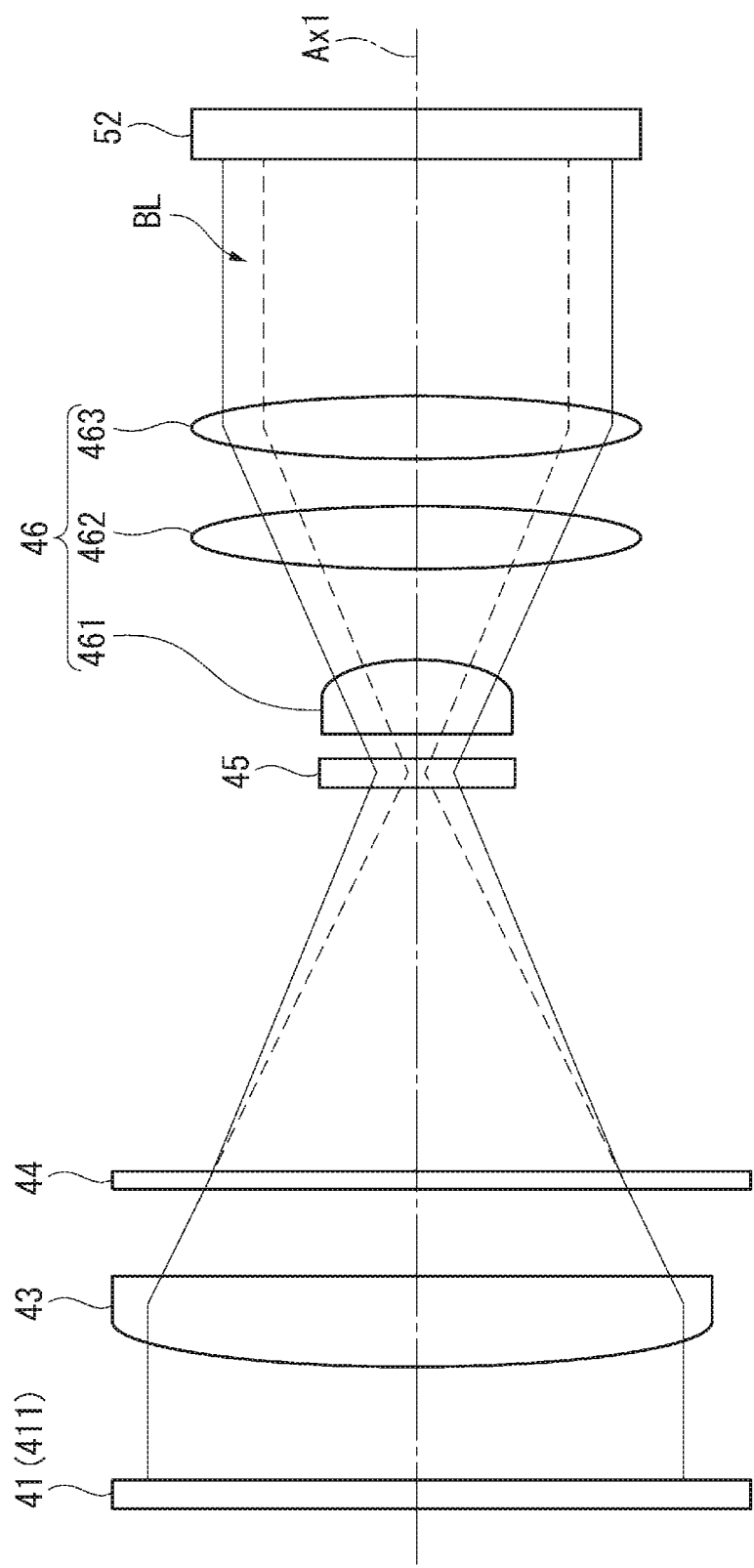
FIG. 5 is a schematic view showing the function of an auxiliary diffusing element in the embodiment.

FIG. 5 is a schematic view for explaining the function of the auxiliary diffusing element 44.

As shown in FIG. 5, the blue lights BL emitted from the first light source sections 411 of the solid-state light source SL1 (see FIG. 3) are incident on the condensing lens 43 through the prism mirror 42 (not shown in FIG. 5), and are superimposed onto the diffusing device 45. However, the optical path length of the blue light BL from the first light source section 411 to the diffusing device 45 is shorter than the optical path length of the excitation light EL from the second light source section 412 to the wavelength conversion device 51. Therefore, the luminous flux diameter (image size) of the blue light BL on the diffusing device 45 is likely to be smaller than the luminous flux diameter (image size) of the excitation light EL on the wavelength conversion device 51. For example, in the absence of the auxiliary diffusing element 44, the blue light BL is condensed by the condensing lens 43, and thus the luminous flux diameter (image size) of the blue light BL on the diffusing device 45 is very small as shown by the dotted line in FIG. 5.

When the blue light BL described above is diffusely emitted through the diffusing device 45, the blue light BL does not spread as much as the fluorescence YL, which makes it difficult to match the image size of the blue light BL on the diffusing device 45 to the image size of the fluorescence YL on the wavelength conversion device 51. In this case, a difference occurs between the image sizes of the blue light BL and the fluorescence YL on the second lens array 313, which is located at the rear stage on the optical path with respect to the light source device 4 and on which the images formed on the diffusing device 45 and the wavelength conversion device 51 are formed again. If such a difference occurs, losses due to stopping down by the second lens array 313 are different. Therefore, when a formed image is projected onto the projection surface, color unevenness occurs due to a difference in illuminance ratio between the blue light BL and the fluorescence YL.

In contrast, when the auxiliary diffusing element 44 diffusely transmits the blue light BL incident from the condensing lens 43, the blue light BL incident on the diffusing device 45 can spread as shown by the solid line in FIG. 5. With this configuration, the image size of the blue light BL on the diffusing device 45 can be matched to the image size of the excitation light EL on the wavelength conversion device 51, and thus, the image size of the blue light BL and the image size of the fluorescence YL on the second lens array 313 can be matched to each other. Hence, the occurrence of color unevenness can be suppressed in an image displayed on the projection surface.

According to the projector 1 according to the embodiment described above, the following advantageous effects are provided.

The optical path of the excitation light EL from the second light source section 412 of the light source section 41 to the wavelength conversion device 51 is longer than the optical path of the blue light BL from the first light source section 411 of the light source section 41 to the diffusing device 45. According to this configuration, the afocal optical device 47, the diffusing element 49, and the second condensing element 50 can be disposed on the optical path of the excitation light EL, and therefore, the luminous flux diameter (image size) of the excitation light EL on the wavelength conversion device 51 can be easily adjusted.

Moreover, the blue light BL whose optical path is shorter than that of the fluorescence YL can be diffusely incident on the diffusing device 45 by the auxiliary diffusing element 44. That is, the luminous flux diameter (image size) of the blue light BL on the diffusing device 45 can be adjusted, which makes it possible to match the image size of the blue light BL to the image size of the excitation light EL on the wavelength conversion device 51. Hence, the image sizes of the blue light BL and the fluorescence YL on the second lens array 313 can be matched to each other. Therefore, the generation of regions that are different in illuminance ratio due to the difference between the image sizes can be suppressed, and the occurrence of color unevenness can be suppressed in an image displayed on the projection surface.

In addition, the occurrence of the color unevenness can be suppressed by the auxiliary diffusing element 44, and thus the optical path of the blue light BL from the first light source section 411 to the diffusing device 45 can be set shorter than the optical path of the excitation light EL from the second light source section 412 to the wavelength conversion device 51. Therefore, the light source device can be miniaturized.

The diffusing device 45 is a transmissive diffusing device that diffuses the incident blue light BL while transmitting the blue light BL. According to this configuration, compared to the case where the diffusing device 45 is configured as a reflective diffusing device and thus diffuses the blue light BL while reflecting the blue light BL, the lengthening of the optical path of the blue light BL can be suppressed. Hence, the light source device 4 can be miniaturized.

The first light source section 411 includes the plurality of solid-state light sources SL1 each emitting light. The light source device 4 includes the condensing lens 43 located between the first light source section 411 and the auxiliary diffusing element 44 on the optical path of the blue light BL and serving as a superimposing element that superimposes the blue lights BL emitted from the solid-state light sources SL1 onto the diffusing device 45. According to this configuration, the blue lights BL emitted from the solid-state light sources SL1 are superimposed onto the diffusing device 45 by the condensing lens 43, and therefore, the occurrence of luminance unevenness can be suppressed in the blue light BL diffusely emitted from the diffusing device 45.

The condensing lens 43 is formed of one lens. Therefore, the lengthening of the optical path of the blue light BL from the first light source section 411 to the diffusing device 45 can be suppressed, and the light source device 4 can be easily miniaturized.

Further, the luminous flux diameter of the blue light BL incident on the diffusing device 45 can be widened by the auxiliary diffusing element 44, and thus, the image size of the blue light on the diffusing device 45 can be increased. With this configuration, the image size of the blue light BL on the diffusing device 45 can be matched to the image size of the excitation light EL on the wavelength conversion device 51. Hence, the occurrence of the color unevenness can be favorably suppressed in a displayed image.

The light source section 41 includes the first light source section 411 emitting the blue light BL along the first illumination optical axis Ax1, and the second light source section 412 disposed side by side with the first light source section 411 and emitting the excitation light EL along the second illumination optical axis Ax2. The light source device 4 further includes the reflective member 48 reflecting, along the third illumination optical axis Ax3, the excitation light EL emitted from the second light source section 412. Further, the wavelength conversion device 51 is disposed on the third illumination optical axis Ax3, and emits the fluorescence YL in the direction opposite to the incident direction of the excitation light EL. The light combining device 52 is located at the intersection of the first illumination optical axis Ax1 and the third illumination optical axis Ax3. According to this configuration, the optical path of the excitation light EL traveling along the second illumination optical axis Ax2 and the third illumination optical axis Ax3 can be reliably made longer than the optical path of the blue light BL traveling along the first illumination optical axis Ax1. Moreover, compared to the configuration in which the second light source section 412 is disposed at a position where the second light source section 412 emits the excitation light EL along the third illumination optical axis Ax3, the light source device 4 can be miniaturized.

The first lens 471 constituting the afocal optical device 47 is disposed between the second light source section 412 and the reflective member 48 on the second illumination optical axis Ax2, and condenses the excitation light EL emitted from the second light source section 412. According to this configuration, compared to the case where the first lens 471 is absent, the use efficiency of light emitted from the second light source section 412 can be increased.

The second lens 472 similarly constituting the afocal optical device 47 is disposed between the reflective member 48 and the light combining device 52 on the third illumination optical axis Ax3, and collimates the excitation light EL reflected by the reflective member 48. Further, the second condensing element 50 serving as the excitation light condensing element is disposed between the light combining device 52 and the wavelength conversion device 51 on the third illumination optical axis Ax3. The second condensing element 50 condenses the excitation light EL onto the wavelength conversion device 51, collimates the fluorescence YL incident from the wavelength conversion device 51, and causes the fluorescence YL to be incident on the light combining device 52. According to this configuration, the excitation light EL collimated by the second lens 472 is condensed by the second condensing element 50 and incident on the wavelength conversion device 51, and therefore, the excitation light EL can be efficiently incident on the wavelength conversion device 51. Further, the second condensing element 50 collimates the fluorescence YL emitted from the wavelength conversion device 51 and causes the fluorescence YL to be incident on the light combining device 52. Therefore, the diffuse emission of the fluorescence YL can be suppressed, and the fluorescence YL can be properly incident on the homogenizing device 31.

In addition, the image size of the excitation light EL on the wavelength conversion device 51 can be adjusted by adjusting the condensing magnification of the excitation light EL through the afocal optical device 47 (the first lens 471 and the second lens 472) and the second condensing element 50. Hence, the image sizes of the excitation light EL and the blue light BL on the wavelength conversion device 51 and the diffusing device 45 can be matched to each other, and the occurrence of the color unevenness can be favorably suppressed.

Here, if illuminance unevenness occurs in an illumination region illuminated by the excitation light EL on the wavelength conversion device 51, and when the excitation light EL having a locally high illuminance is incident on the illumination region, thermal saturation is likely to occur in the wavelength conversion device 51 (the wavelength conversion element 511). When such thermal saturation occurs, wavelength conversion efficiency for the fluorescence YL is reduced, and also, the life span of the wavelength conversion element 511 may be shortened.

In contrast, the diffusing element 49 is disposed between the second lens 472 and the light combining device 52, and the diffusing element 49 diffuses the excitation light EL incident from the second lens 472. According to this configuration, the excitation light EL diffused by the diffusing element 49 is condensed by the second condensing element 50 and incident on the wavelength conversion device 51, and therefore, the occurrence of illuminance unevenness can be suppressed in the illumination region illuminated by the excitation light EL. Hence, the occurrence of the thermal saturation can be suppressed, and the reduction in wavelength conversion efficiency for the fluorescence YL, and the shortening of the life span of the wavelength conversion element 511 can be suppressed.

Second Embodiment

Next, a second embodiment of the invention will be described.

A projector according to the embodiment is configured and functions similarly to the projector 1, but differs in the configuration of the light source device. More specifically, the projector according to the embodiment differs from the projector 1 in the arrangement of optical components in the light source device. In the following description, portions that are the same or substantially the same as the previously described portions are denoted by the same reference numerals and signs, and will not be described here.

Figure 6:
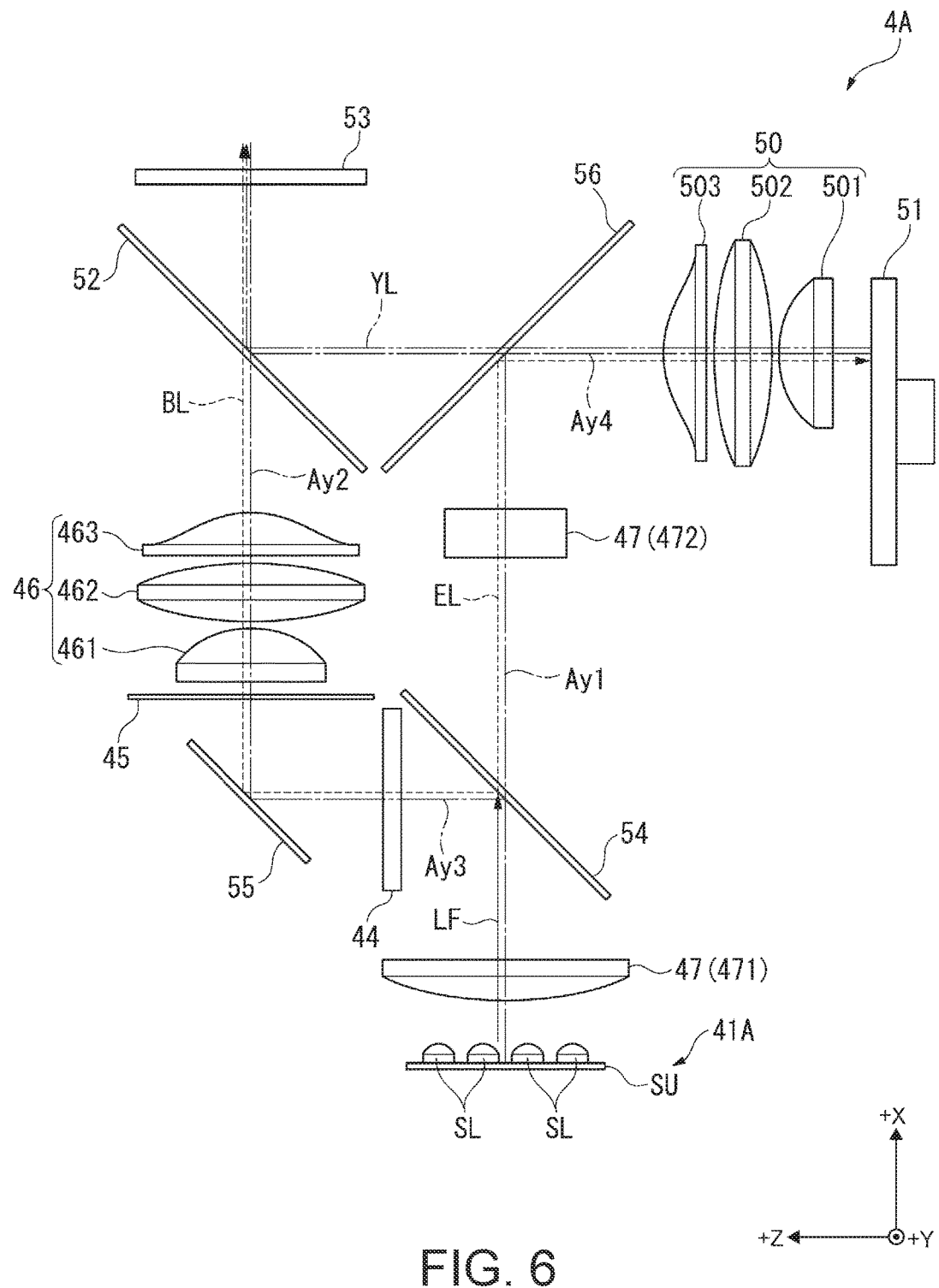
FIG. 6 is a schematic view showing the configuration of a light source device included in a projector according to a second embodiment of the invention.

FIG. 6 is a schematic view showing the configuration of a light source device 4A included in the projector according to the embodiment.

The projector according to the embodiment is configured and functions similarly to the projector 1, except that although not shown, the projector includes the light source device 4A instead of the light source device 4.

Similarly to the light source device 4, the light source device 4A emits illumination light to the homogenizing device 31. As shown in FIG. 6, the light source device 4A includes a light source section 41A, the afocal optical device 47, a light separating device 54, the auxiliary diffusing element 44, a reflective member 55, the diffusing device 45, the first condensing element 46, a dichroic mirror 56, the second condensing element 50, the wavelength conversion device 51, the light combining device 52, and the retardation film 53. The light source device 4A functions similarly to the light source device 4.

Four illumination optical axes Ay1 to Ay4 are set in the light source device 4A.

The first illumination optical axis Ay1 and the second illumination optical axis Ay2 are parallel to each other, and are each set along the +X-direction. The second illumination optical axis Ay2 is set in the +Z-direction with respect to the first illumination optical axis Ay1.

The third illumination optical axis Ay3 and the fourth illumination optical axis Ay4 are parallel to each other, and are each set along the +Z-direction. The third illumination optical axis Ay3 intersects the first illumination optical axis Ay1 and the second illumination optical axis Ay2. Also, the fourth illumination optical axis Ay4 intersects the first illumination optical axis Ay1 and the second illumination optical axis Ay2. The fourth illumination optical axis Ay4 is set in the +X-direction with respect to the third illumination optical axis Ay3.

The optical components are disposed on the illumination optical axes Ay1 to Ay4. The first illumination optical axis Ay1 and the second illumination optical axis Ay2 may not be perfectly parallel to each other. The third illumination optical axis Ay3 and the fourth illumination optical axis Ay4 may not be perfectly parallel to each other. Moreover, the third illumination optical axis Ay3 and the fourth illumination optical axis Ay4 may not be orthogonal to the first illumination optical axis Ay1 and the second illumination optical axis Ay2, and it is sufficient that the third illumination optical axis Ay3 and the fourth illumination optical axis Ay4 intersect the illumination optical axes Ay1 and Ay2.

Specifically, the light source section 41A, the afocal optical device 47, the light separating device 54, and the dichroic mirror 56 are located on the first illumination optical axis Ay1. The light separating device 54 is located at the intersection of the first illumination optical axis Ay1 and the third illumination optical axis Ay3. The auxiliary diffusing element 44 and the reflective member 55 are located on the third illumination optical axis Ay3. The reflective member 55 is located at the intersection of the third illumination optical axis Ay3 and the second illumination optical axis Ay2. The diffusing device 45, the first condensing element 46, the light combining device 52, and the retardation film 53 are located on the second illumination optical axis Ay2. The second illumination optical axis Ay2 coincides with the illumination optical axis Ax.

On the other hand, the dichroic mirror 56 is located at the intersection of the first illumination optical axis Ay1 and the fourth illumination optical axis Ay4. The second condensing element 50 and the wavelength conversion device 51 are located on the fourth illumination optical axis Ay4. The light combining device 52 is located at the intersection of the fourth illumination optical axis Ay4 and the second illumination optical axis Ay2.

In the light source device 4A, the light source section 41A includes at least one solid-state light source unit SU in which a plurality of the solid-state light sources SL each emitting blue light are arranged, and thus emits a luminous flux LF of the blue light along the first illumination optical axis Ay1.

In the first lens 471 and the second lens 472 constituting the afocal optical device 47, the first lens 471 condenses the luminous flux LF emitted from the plurality of solid-state light sources SL and superimposes the luminous flux LF onto a predetermined position. Examples of the predetermined position include the arrangement position of the second lens 472 or the diffusing device 45.

The light separating device 54 separates the luminous flux LF incident from the first lens 471 at a predetermined ratio. In the embodiment, the light separating device 54 is formed of a half-mirror. The light separating device 54 transmits, along the first illumination optical axis Ay1, a portion of light (the excitation light EL) of the luminous flux LF that is used for wavelength conversion performed by the wavelength conversion device 51, and reflects, along the third illumination optical axis Ay3, the remaining light (the blue light BL) that is used as a blue component of the illumination light emitted from the light source device 4A. The transmittance and reflectance of the light separating device 54 are set such that the amount of the excitation light EL is greater than the amount of the blue light BL.

The blue light BL separated by the light separating device 54 is incident on the auxiliary diffusing element 44. The blue light BL diffused by the auxiliary diffusing element while transmitting therethrough is reflected by the reflective member 55 along the second illumination optical axis Ay2. The luminous flux diameter (image size) of the blue light BL on the diffusing device 45 is adjusted (increased) by the auxiliary diffusing element 44, similarly to the configuration shown in the first embodiment. The reflective member 55 can be formed of a total reflecting mirror. In addition, the reflective member 55 may be configured to include a reflective surface formed in a spherical or aspherical surface shape so as to assist the first lens 471 in condensing the blue light BL.

The blue light BL whose optical path is changed to be along the second illumination optical axis Ay2 is diffused, while transmitting through the diffusing device 45, at a diffusivity previously set in the diffusing device 45 as described above, and is incident on the first condensing element 46. Then, the blue light BL is collimated by the first condensing element 46 and incident on the light combining device 52.

The excitation light EL separated by the light separating device 54 is collimated by the second lens of the afocal optical device 47 and incident on the dichroic mirror 56.

The dichroic mirror 56 has the function of reflecting blue light and transmitting light (green light and red light) at a wavelength longer than the wavelength of the blue light. For this reason, the excitation light EL traveling along the first illumination optical axis Ay1 is reflected by the dichroic mirror 56 along the fourth illumination optical axis Ay4, and incident on the second condensing element 50.

As described above, the second condensing element condenses the incident excitation light EL onto the wavelength conversion layer of the wavelength conversion device 51, condenses and collimates the fluorescence YL generated in the wavelength conversion layer, and emits the fluorescence YL toward the dichroic mirror 56. The fluorescence YL transmits through the dichroic mirror 56 and is incident on the light combining device 52.

Also in the embodiment, the wavelength conversion device 51 is configured as a reflective wavelength conversion device. Moreover, the optical path length of the excitation light EL from the light source section 41A to the wavelength conversion device 51 is longer than the optical path length of the blue light BL from the light source section 41A to the diffusing device 45.

The fluorescence YL incident on the light combining device 52 along the fourth illumination optical axis Ay4 is reflected by the light combining device 52 along the second illumination optical axis Ay2, and incident on the retardation film 53.

On the other hand, the blue light BL incident on the light combining device 52 along the second illumination optical axis Ay2 passes through the light combining device 52 along the second illumination optical axis Ay2, and is incident on the retardation film 53.

With this configuration, the blue light BL and the fluorescence YL are emitted from the light source device 4A through the retardation film 53 along the second illumination optical axis Ay2 (i.e., the illumination optical axis Ax), and are incident as illumination light on the homogenizing device 31.

According to the projector according to the embodiment including the light source device 4A described above, advantageous effects similar to those of the projector 1 can be provided.

MODIFICATIONS OF EMBODIMENTS

The invention is not limited to the embodiments. The invention includes modifications and improvements within the scope capable of achieving the advantage of the invention.

In the embodiments, the wavelength conversion device 51 is configured to include the wavelength conversion element 511, the rotating device 512, and the heat dissipating member 513. However, the wavelength conversion device 51 is not limited to this. It is sufficient that the wavelength conversion device 51 is configured to include the wavelength conversion element 511. The rotating device 512 and the heat dissipating member 513 may not be necessarily included. Moreover, the wavelength conversion device 51 is configured as a reflective wavelength conversion device that diffusely emits the fluorescence YL in the direction opposite to the incident direction of the excitation light EL. However, the wavelength conversion device 51 is not limited to this, and a transmissive wavelength conversion device may be employed in the light source device.

In the embodiments, the diffusing device 45 is configured to include the substrate 451 including the diffusion layer, and the rotating device 452. However, the diffusing device 45 is not limited to this, and it is sufficient that the diffusing device 45 is configured to include the substrate 451. The rotating device 452 may not be necessarily included. As described above, speckles can be favorably reduced by rotating the substrate 451.

Further, in the embodiments, the light combining device 52 is configured to include the dichroic mirror transmitting the blue light BL and reflecting the fluorescence YL to thereby combine the blue light BL and the fluorescence YL together. However, the light combining device 52 is not limited to this. The light combining device 52 may be configured differently as long as the light combining device 52 can combine the blue light BL and the fluorescence YL together.

In the first embodiment, the auxiliary diffusing element 44 is disposed between the condensing lens 43 and the diffusing device 45. However, the auxiliary diffusing element 44 is not limited to this, and may be located on the incident side of the blue light BL with respect to the condensing lens 43.

Moreover, the auxiliary diffusing element 44 is the diffuser (frosted glass) having a diffusivity lower than that of the diffusing device 45. However, the auxiliary diffusing element 44 is not limited to this, and may be configured differently as long as the auxiliary diffusing element 44 can diffusely emit the incident blue light BL. The same applies to the auxiliary diffusing element 44 employed in the light source device 4A shown in the second embodiment.

In the embodiments, the diffusing device 45 diffusely transmits the incident blue light BL. However, the diffusing device 45 is not limited to this, and may be configured to diffusely reflect the incident blue light BL.

In the first embodiment, the light source device 4 includes the condensing lens 43 serving as a superimposing element that superimposes the blue lights BL emitted from the solid-state light sources SL1 of the first light source section 411 onto the diffusing device 45. However, the light source device 4 is not limited to this, and may not include the condensing lens 43. Moreover, the condensing lens 43 may not necessarily superimpose the blue lights BL as long as the condensing lens 43 can condense the blue lights BL emitted from the solid-state light sources SL1 onto the diffusing device 45. Further, the superimposing element may not be one lens and may be configured differently as long as the above function of the superimposing element can be realized.

In the first embodiment, the first light source section 411 and the second light source section 412 are disposed side by side along the +Z-direction. However, the arrangement of the light source sections is not limited to this. The second light source section 412 may be shifted to the side (i.e., the −X-direction side) opposite to the exiting side of the excitation light EL with respect to the first light source section 411. When the first light source section 411 and the second light source section 412 are disposed side by side in the +Z-direction, the light source device can be further miniaturized because one of the light source sections does not project to the −X-direction side with respect to the other light source section.

In the first embodiment, the first light source section 411 and the second light source section 412 are integrated together by means of the heat dissipating member 413 functioning also as a support member. However, the light source section is not limited to this. Light emitted from a region of one light source section that corresponds to the first light source section may be used as blue light, and light emitted from a region of the light source section that corresponds to the second light source section may be used as excitation light.

Further, the first light source section 411 and the second light source section 412 may be disposed separately from each other. For example, the second light source section 412 and the first lens 471 may be disposed on the third illumination optical axis Ax3 in the light source device 4. In this case, the light source device is increased in size, but the reflective member 48 can be omitted.

In the second embodiment, the light source section 41A emits the luminous flux LF including the blue light BL and the excitation light EL. However, the light source section 41A is not limited to this. A light source section that emits the excitation light EL along the first illumination optical axis Ay1 and a light source section that emits the blue light BL along the second illumination optical axis Ay2 may be separately disposed. In this case, the condensing lens 43 condensing the incident blue light BL onto the diffusing device and the auxiliary diffusing element 44 diffusing the incident blue light BL may be disposed on the second illumination optical axis Ay2. With this configuration, the light separating device 54 and the reflective member 55 can be omitted.

That is, the arrangement of the optical components shown in each of the light source devices 4 and 4A is illustrative only, and the arrangement of the optical components may be changed within the scope capable of achieving the advantage of the invention.

In the embodiments, the afocal optical device 47 including the first lens 471 and the second lens 472 is disposed on the optical path of the excitation light EL. Moreover, the second condensing element 50 (excitation light condensing element) condensing the collimated light emitted from the afocal optical device 47 onto the wavelength conversion device and collimating the fluorescence YL emitted from the wavelength conversion device 51 is disposed on the optical path of the excitation light EL. However, the afocal optical device 47 and the second condensing element 50 may be omitted. For example, instead of the second lens 472, the reflective member 48 may have the function of collimating the incident excitation light EL in the light source device 4. In view of the incident efficiency of the excitation light EL on the wavelength conversion device 51 or the use efficiency of the emitted fluorescence YL, the second condensing element 50 is preferably disposed on the incident side of the excitation light EL with respect to the wavelength conversion device 51.

In the first embodiment, the diffusing element 49 serving as a substitute for the homogenizer optical device is disposed between the second lens 472 and the light combining device 52 on the third illumination optical axis Ax3. However, the invention is not limited to this. The diffusing element 49 may be omitted, and the homogenizer optical device may be disposed instead of the diffusing element 49.

On the other hand, the diffusing element 49 may be provided between the second lens 472 and the dichroic mirror 56 on the second illumination optical axis Ay2, or between the dichroic mirror 56 and the second condensing element 50 on the fourth illumination optical axis Ay4, in the light source device 4A according to the second embodiment.

In the embodiments, the projector includes the light modulating devices 343 (343R, 343G, 343B) each including the liquid crystal panel. However, the projector is not limited to this. The invention can also be applied to a projector including two or less, or four or more light modulating devices.

In the embodiments, the image projecting device 3 is configured such that the optical components are disposed in the layout shown in FIG. 2. However, the image projecting device 3 is not limited to this. The layout can be appropriately changed in the image projecting device 3, and some of the optical components may be omitted.

In the embodiments, the light modulating device 343 is configured to include the transmissive liquid crystal panel whose light incident and light exiting surfaces are different from each other. However, the light modulating device 343 is not limited to this. The light modulating device 343 may be configured to include a reflective liquid crystal panel whose light incident and light exiting surfaces are identical. Moreover, a light modulating device other than that of liquid crystal, such as a device using a micromirror, for example, using a digital micromirror device (DMD) may be used.

In the embodiments, the projection optical device 35 is configured to include the aspheric mirror 352 disposed on the most downstream side of the optical path in the projection optical device 35 and reflecting the image light incident from the plurality of lenses 351. However, the projection optical device 35 is not limited to this, and may not include the aspheric mirror 352. That is, the projection optical device 35 may be configured to project image light incident along the optical axis (optical axis along the −Z-direction) of the lens 351, along the optical axis.

In the embodiments, an example of applying the light source device 4 according to the invention to the projector is exemplified. However, the invention is not limited to this. For example, the light source device according to the invention may be employed in a luminaire, a headlight of an automobile, and the like.

The entire disclosure of Japanese Patent Application No. 2017-016874, filed Feb. 1, 2017 is expressly incorporated by reference herein.

What is claimed is:

1. A light source device comprising:
a light source section;
a diffusing device on which a portion of light emitted from the light source section is incident, the diffusing device diffusely emitting the portion of the light;
a wavelength conversion device on which another portion of the light emitted from the light source section is incident, the wavelength conversion device diffusely emitting converted light at a wavelength different from that of the another portion of the light;
a light combining device combining the portion of the light diffused by the diffusing device with the converted light emitted from the wavelength conversion device; and
an auxiliary diffusing element located between the light source section and the diffusing device on an optical path of the portion of the light, the auxiliary diffusing element diffusing the portion of the light and causing the portion of the light to be incident on the diffusing device, wherein
an optical path of the another portion of the light from the light source section to the wavelength conversion device is longer than the optical path of the portion of the light from the light source section to the diffusing device.

2. The light source device according to claim 1, wherein the diffusing device diffuses the portion of the light incident thereon while transmitting the portion of the light.

3. A projector comprising:
the light source device according to claim 2;
a light modulating device modulating light emitted from the light source device; and
a projection optical device projecting the light modulated by the light modulating device.

4. The light source device according to claim 1, wherein the light source section includes a plurality of solid-state light sources each emitting light,
the light source device includes a superimposing element located between the light source section and the auxiliary diffusing element on the optical path of the portion of the light and superimposing the portion of the light emitted from the plurality of solid-state light sources onto the diffusing device, and
the superimposing element is formed of one lens.

5. A projector comprising:
the light source device according to claim 4;
a light modulating device modulating light emitted from the light source device; and
a projection optical device projecting the light modulated by the light modulating device.

6. The light source device according to claim 1, wherein the light source section includes
a first light source section emitting blue light as the portion of the light along a first illumination optical axis, and
a second light source section disposed side by side with the first light source section and emitting excitation light as the another portion of the light along a second illumination optical axis substantially parallel to the first illumination optical axis,
the light source device includes a reflective member reflecting the excitation light emitted from the second light source section, along a third illumination optical axis intersecting the first illumination optical axis and the second illumination optical axis,
the wavelength conversion device is disposed on the third illumination optical axis and emits the converted light in a direction opposite to an incident direction of the excitation light, and
the light combining device is located at an intersection of the first illumination optical axis and the third illumination optical axis.

7. The light source device according to claim 6, further comprising:
a first lens disposed between the second light source section and the reflective member on the second illumination optical axis, the first lens condensing the excitation light emitted from the second light source section;
a second lens disposed between the reflective member and the light combining device on the third illumination optical axis, the second lens collimating the excitation light reflected by the reflective member; and
an excitation light condensing element disposed between the light combining device and the wavelength conversion device on the third illumination optical axis, the excitation light condensing element condensing the excitation light onto the wavelength conversion device, collimating the converted light incident from the wavelength conversion device, and causing the converted light to be incident on the light combining device.

8. The light source device according to claim 7, further comprising a diffusing element disposed between the second lens and the light combining device and diffusing the excitation light incident on the diffusing element.

9. A projector comprising:
the light source device according to claim 8;
a light modulating device modulating light emitted from the light source device; and
a projection optical device projecting the light modulated by the light modulating device.

10. A projector comprising:
the light source device according to claim 6;
a light modulating device modulating light emitted from the light source device; and
a projection optical device projecting the light modulated by the light modulating device.

11. A projector comprising:
the light source device according to claim 7;
a light modulating device modulating light emitted from the light source device; and
a projection optical device projecting the light modulated by the light modulating device.

12. A projector comprising:
the light source device according to claim 1;
a light modulating device modulating light emitted from the light source device; and
a projection optical device projecting the light modulated by the light modulating device.

* * * * *